F. VON MARTINI'S
IMPROVEMENTS IN BREECH LOADING FIRE ARMS.
No. 120,800.
3 Sheets--Sheet 1.
Patented Nov. 7, 1871.
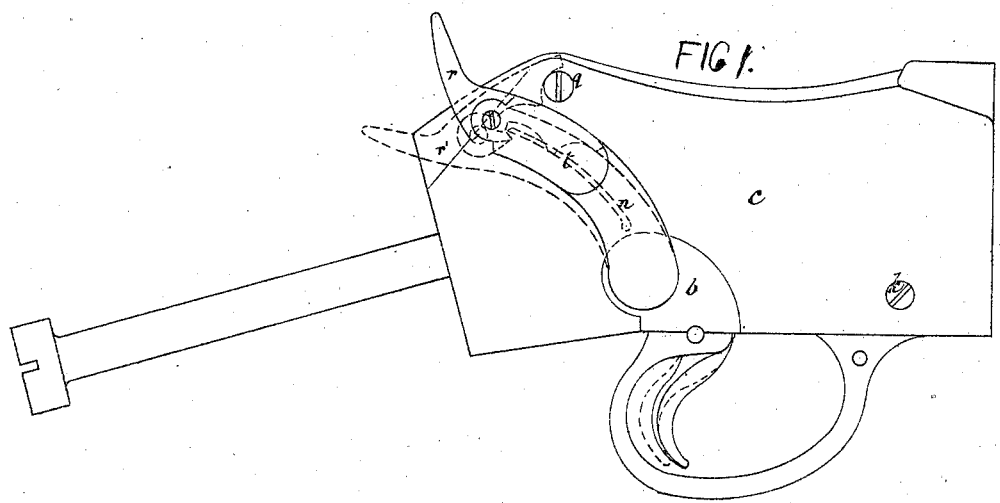
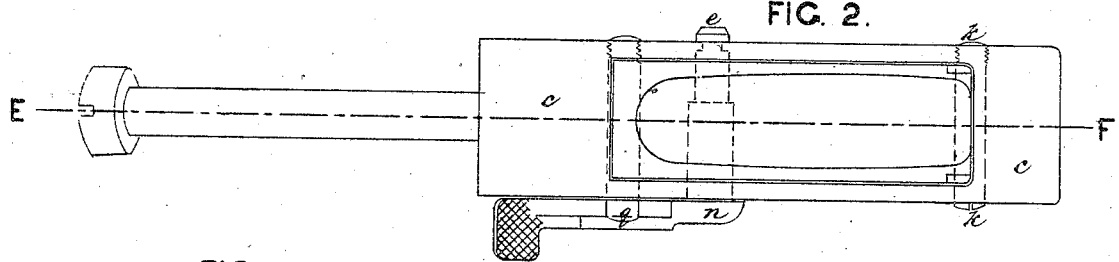
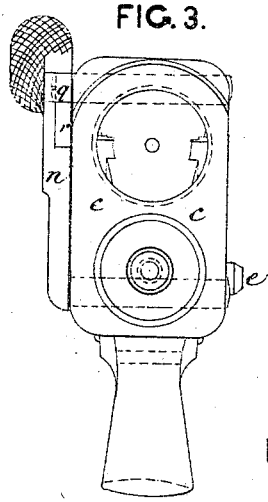
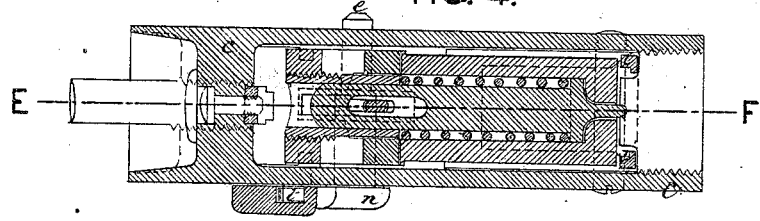
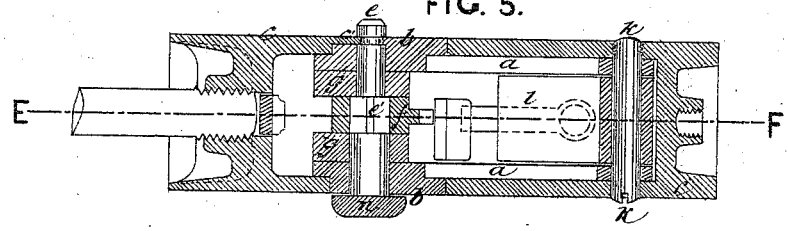

F. VON MARTINI'S
IMPROVEMENTS IN BREECH LOADING FIRE ARMS.

No. 120,800. Patented Nov. 7, 1871.

3 Sheets--Sheet 3.

F. VON MARTINI'S
IMPROVEMENTS IN BREECH LOADING FIRE ARMS.

No. 120,800.
Patented Nov. 7, 1871.

C. B. Nottingham
J. R. Nottingham
Witnesses

F. von Martini
by his attorney
A. Pollok

UNITED STATES PATENT OFFICE.

FRIEDRICH VON MARTINI, OF FRAUENFELD, SWITZERLAND.

IMPROVEMENT IN BREECH-LOADING FIRE-ARMS.

Specification forming part of Letters Patent No. 120,800, dated November 7, 1871.

*To all whom it may concern:*

Be it known that I, FRIEDRICH VON MARTINI, of Frauenfeld, Switzerland, have invented certain Improvements in Breech-Loading Fire-Arms, of which the following is a specification:

This invention relates to certain improvements in the well-known Martini breech-loading action, forming the subject of the Letters Patent No. 90,614, dated the 25th day of May, 1869, in which a vertically-tilting or swinging breech-block is employed, with a firing-pin, which may be either a percussion-pin or a needle actuated by a special spring, the arm being arranged for either a central-fire or an annular-fire cartridge.

The improvements will be clearly understood from the following description thereof, reference being had to the accompanying drawing, in which the parts are represented as adapted to receive a central-fire cartridge.

Figure 6:
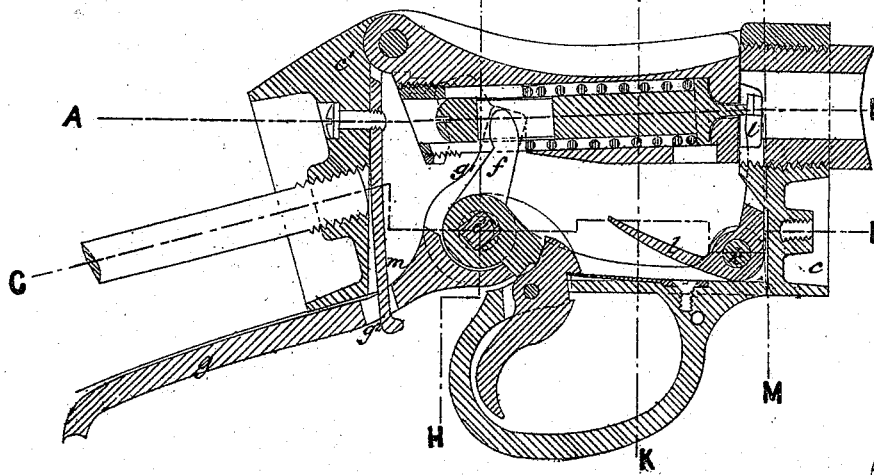
Figure 9:
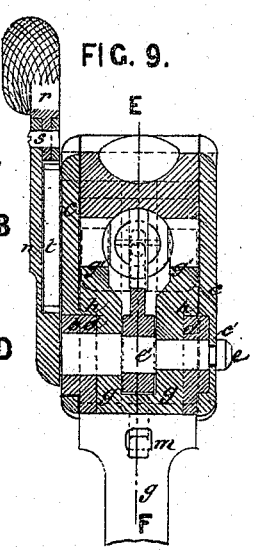
Figure 7:
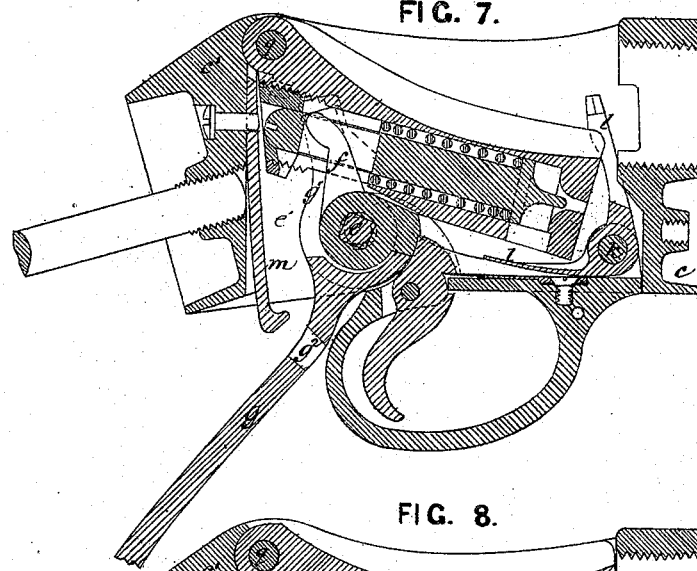
Figure 10:
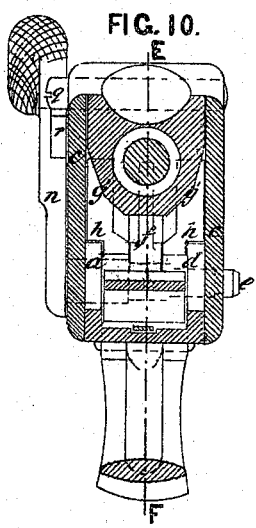
Figure 8:
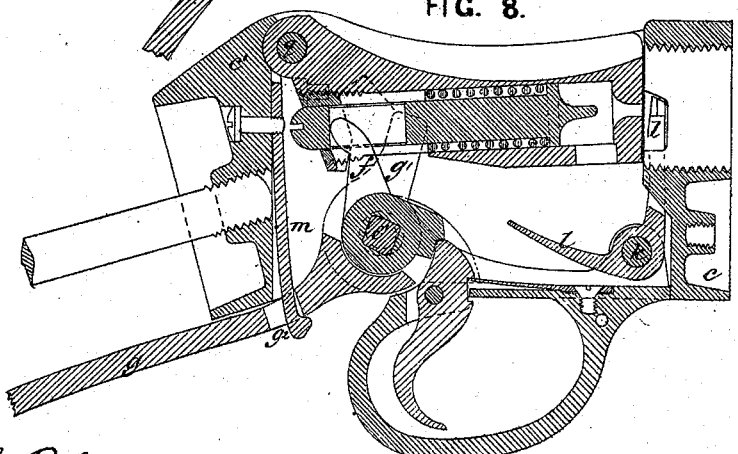
Figure 11:
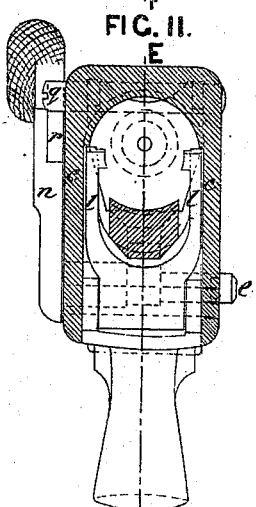
Figure 21:
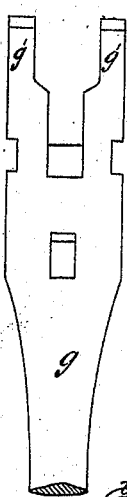
Figure 12:
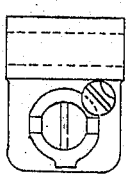
Figure 13:
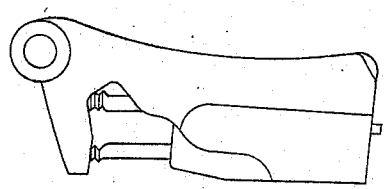
Figure 14:
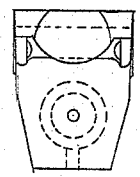
Figure 15:
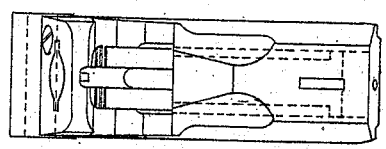
Figures 16, 17, 19:
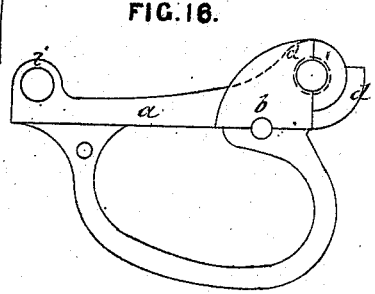
Figures 18, 20:
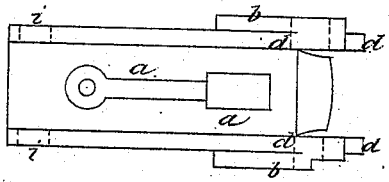
Figure 22:
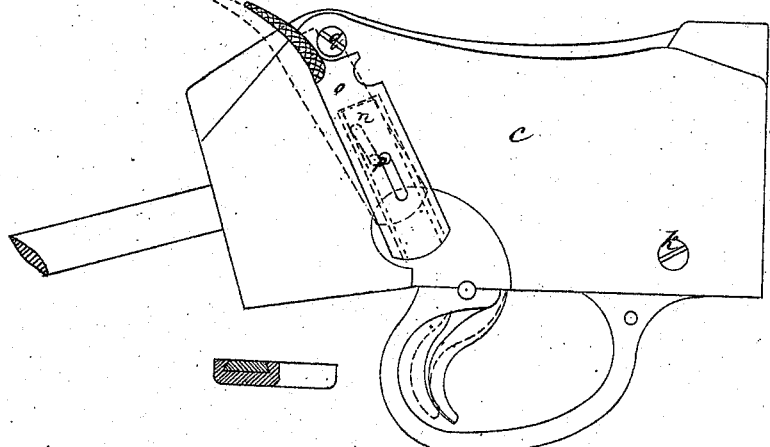
Figure 23:
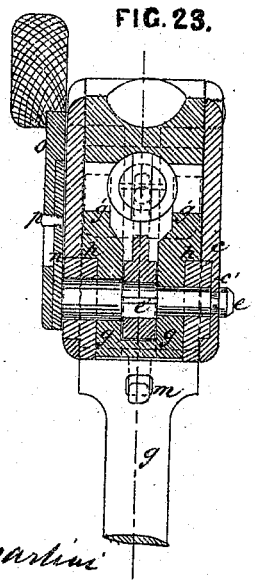

Figure 1 is a side elevation of the breech-receiver with other external parts. Fig. 2 is a plan of the upper part of same. Fig. 3 is an end elevation of the barrel-end of the breech-receiver. Fig. 4 is a horizontal section of the breech-receiver and mechanism through the line A B of Fig. 6. Fig. 5 is a sectional plan through the line C D of Fig. 6. Fig. 6 is a vertical section through the lines E F of Figs. 2, 4, 5, 9, 10, and 11, the parts being in the position they occupy at the moment the firing-pin strikes the cartridge. Fig. 7 is a section with the breech-block lowered for inserting the cartridge. Fig. 8 is a section with the parts locked in the firing position. Fig. 9 is a transverse section through the line G H of Fig. 6. Fig. 10 is a section through the line I K of Fig. 6. Fig. 11 is a section through the line L M of Fig. 6. Fig. 12 is an elevation of the back end of the breech-block. Fig. 13 is a side elevation of same. Fig. 14 is a front elevation thereof. Fig. 15 is a plan of the under side of the block. Fig. 16 is a side elevation of the removable trigger-plate and guard. Fig. 17 is a back-end elevation thereof. Fig. 18 is a plan of the upper part of same. Fig. 19 is a side elevation of the hand-lever broken off. Fig. 20 is an elevation of its fore end. Fig. 21 is a plan of the lever; and Figs. 22 and 23 show a modification of the indicator-locking arrangement.

According to this invention the original Martini spiral-spring breech-loading action is constructed with a removable trigger-plate, $a$, somewhat resembling that described in the specification of my single flat bent spring-arm forming the subject of the Letters Patent No. 115,546, dated the 30th day of May, 1871, for closing the lower side of the breech-receiver; but in order to render this removable trigger-plate suitable for the purposes of my present invention its rearward end is made with lugs or ears $b$ fitting into corresponding recesses in the sides of the breech-receiver $c$, and formed with circular faces or abutments $d$, arranged concentrically with the fulcrum-pin $e$ of the cocking-lever $f$; and this cocking-lever $f$ is fitted onto a square-shaped portion, $e'$, of its pin $e$ between the short ends $g'$ of the lever $g$. The fulcrum-pin $e$ works freely in bearing-holes formed for it in the lugs or ears $b$ at the rearward end of the trigger-plate $a$, and a part, $c'$ of the breech-receiver takes into a recess or groove in the pin $e$ to prevent it from dropping out of its place. This pin passes very freely through the lever $g$, and the latter is provided with suitably-curved faces or bearing-surfaces $h$, as shown, which rest against and work upon the circular faces or abutments $d$ of the lugs or ears of the trigger-plate already described. The fore end of the trigger-plate is made with small lugs or ears $i$, having holes through them, and is secured in position by the fulcrum-pin $k$ of the forked cartridge-extractor lever $l$. The pin $k$ is screwed at one end, and, after passing through one side of the breech-receiver $c$ and through the lugs $i$ and extractor-lever $l$, screws into a correspondingly-tapped hole in the other side of the breech-receiver $c$. The hand-lever $g$ is held in its closed position against the under part of the stock by means of a spring-catch, $m$, which is attached to the inner part $c'$ of the rear end of the breech-receiver $c$, and takes into a suitable slot, $g^2$, formed in the hand-lever $g$ near its fulcrum, as shown. The external indicator $n$ is made in one piece with the fulcrum-pin $e$ of the cocking-lever $f$, and is provided with an arm or piece, $r$, jointed at $s$ to the indicator $n$, and kept in closed position by means of the flat spring $t$ inserted in $n$, as shown in Fig. 1. When open the arm or piece $r$ engages with a projecting part or extension of the hinge-pin $q$, as shown in Fig. 1 in dotted lines $r'$, thereby locking the discharging mechanism in the firing position when necessary; or, in lieu of the arm or piece $r$, a slide, $o$, may be arranged to slide along the indicator $n$, so as to lock the mechanism in the firing position by engaging with the projecting part or extension of the hinge-pin $q$, as shown in dotted lines in Fig. 22. The slide is prevented from moving too far by the stop or pin $p$, which takes into its slot, as shown.

The construction of this arm differs in several important respects from others of an analogous construction. The hand-lever, the cocking-lever, the indicator, and their common axis-pin, as well as the extractor-lever and the locking arrangement or safety-bolt, in this improved spiral-spring action, are all connected to the trigger-plate, so that they can all be readily taken out with the trigger-plate for examination by simply withdrawing the pin $k$, and be readily and securely replaced in a simple manner, without the employment of buttons or catches. Instead of the hand-lever axis-pin taking all the strain of holding the rear end of the trigger-plate and mechanism in position this strain is taken entirely by the lugs or ears of the trigger-plate. The cocking-lever, in lieu of being made to turn upon a round part of the hand-lever axis-pin $e$ and independently of it, is fixed upon a square part of the pin and turns with it; and the hand-lever is formed with curved faces, which rest against the circular faces or abutments of the lugs or ears of the trigger-plate, thereby preventing any pressure of the hand-lever upon its axis-pin from acting upon the pin in the manner of a friction-break, which would give the spiral main-spring more work to do in drawing the cocking-lever forward, and would proportionately diminish the force with which the exploding-pin would strike the cap. The arrangement of the hand-lever fulcrum-pin within the ears or lugs of the trigger-plate, instead of passing it through the solid sides of the breech-receiver or body, provides two long bearings in lieu of divided bearings for the pin, and the lug or ear, taking partly into a recess in the breech-receiver or body, dispenses with the use of keepers or set-screws for retaining the pin of the hand-lever in its proper place, thereby producing a more substantial and durable spiral-spring action with fewer parts than heretofore. The spring $m$, working in connection with the slot in the hand-lever or handle, affords a more convenient arrangement for holding the hand-lever or handle in its closed position under the stock; and the external indicator, being combined with the jointed part or slide operating in conjunction with the prolonged pin of the breech-block, is made to serve also as a very convenient medium for locking or securing the discharging mechanism, so as to prevent the accidental discharge of the arm.

Having described my invention and the manner in which the same is or may be carried into effect, what I claim, and desire to secure by Letters Patent, is—

1. The removable trigger-plate, made with lugs or ears and having faces or abutments, in combination with the breech-receiver or body, fulcrum-pin, and tilting hand-lever, formed with suitably-curved faces or bearing-surfaces, which rest against and work upon the circular faces or abutments of the lugs or ears of the trigger-plate, whose fore-end is secured in position by the axis-pin of the extractor-lever, all as herein shown and set forth.

2. The combination of the cocking-lever, its fulcrum-pin, and the external indicator, with the jointed part arranged to operate in conjunction with the projecting part or extension of the hinge-pin of the breech-block, as herein shown and set forth.

3. The combination, with the removable trigger-plate, of the external indicator and its slide, the latter being arranged to operate in conjunction with the projecting part or extension of the hinge-pin of the breech-block, as shown and set forth.

4. The combination of the slotted hand-lever, pivoted in the removable trigger-plate, with the spring-catch arranged within the breech-receiver or body, and operating in conjunction with said hand-lever, substantially in the manner shown and specified.

5. A breech-loading mechanism, constructed with the curved surfaces of the pivoting-joint of the hand or tilting-lever made to take their bearings upon and oscillate around corresponding surfaces on the trigger-plate, so as to relieve the axis-pin of the tumbler or cocking-lever from any strain, friction, or gripe, substantially as and for the purposes set forth.

FR. MARTINI.

Witnesses:
C. F. HEINRICH,
S. H. M. BYERS.